Sheet 1_2 Sheets

J. P. Woodbury,
Planing Machine,

Nº 6,211.  Patented Mar. 20, 1849.

N. PETERS, PHOTO-LITHOGRAPHER, WASHINGTON, D.C.

J. P. Woodbury,
Planing Machine,
Nº 6,211. Patented Mar. 20, 1849.
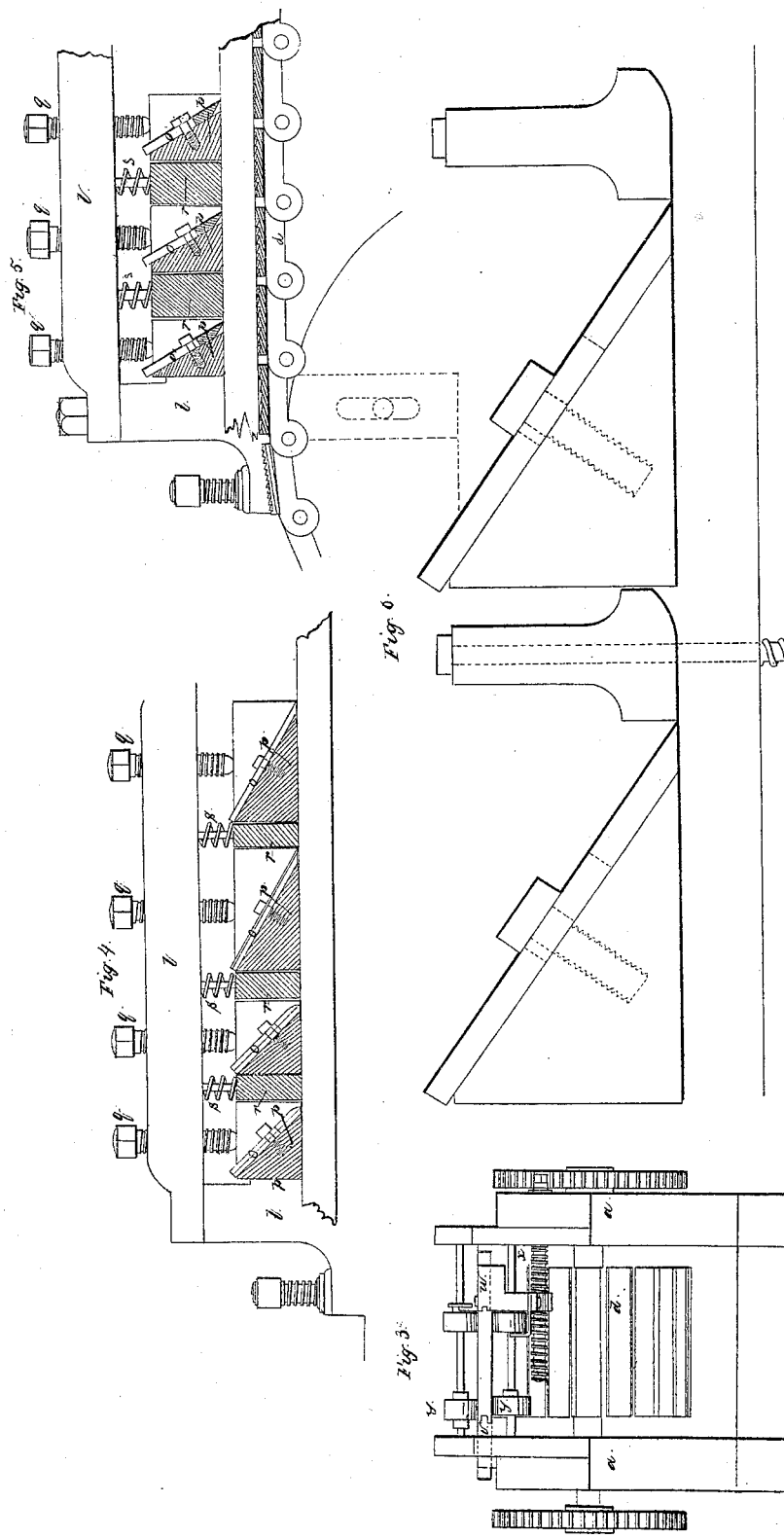
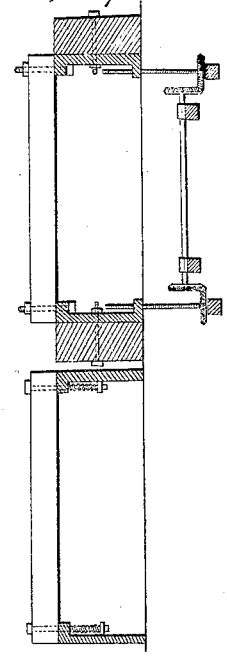
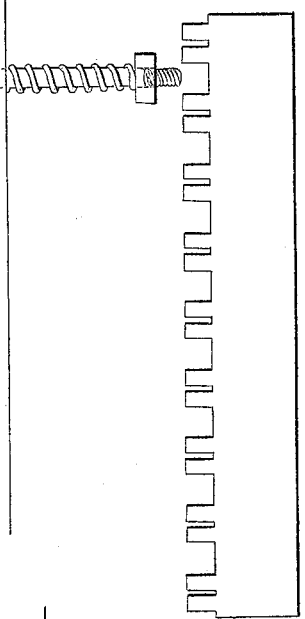
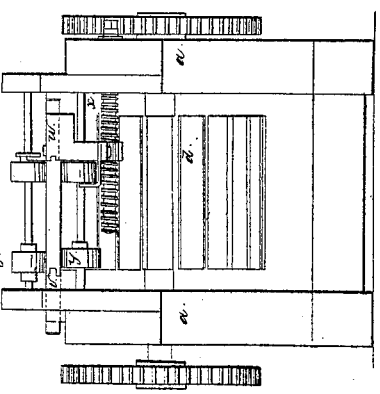

UNITED STATES PATENT OFFICE.

JOSEPH P. WOODBURY, OF BOSTON, MASSACHUSETTS.

PLANING-MACHINE.

Specification of Letters Patent No. 6,211, dated March 20, 1849; Antedated September 20, 1848.

*To all whom it may concern:*

Be it known that I, JOSEPH P. WOODBURY, of Boston, in the county of Suffolk and State of Massachusetts, have invented certain new and useful Improvements in Planing and Tonguing and Grooving Boards, &c., and that the following is a full, clear, and exact description of the principle or character which distinguishes them from all other things before known and of the usual manner of making, modifying, and using the same, reference being had to the accompanying drawing, which illustrates the same, in which—

Figure 1:
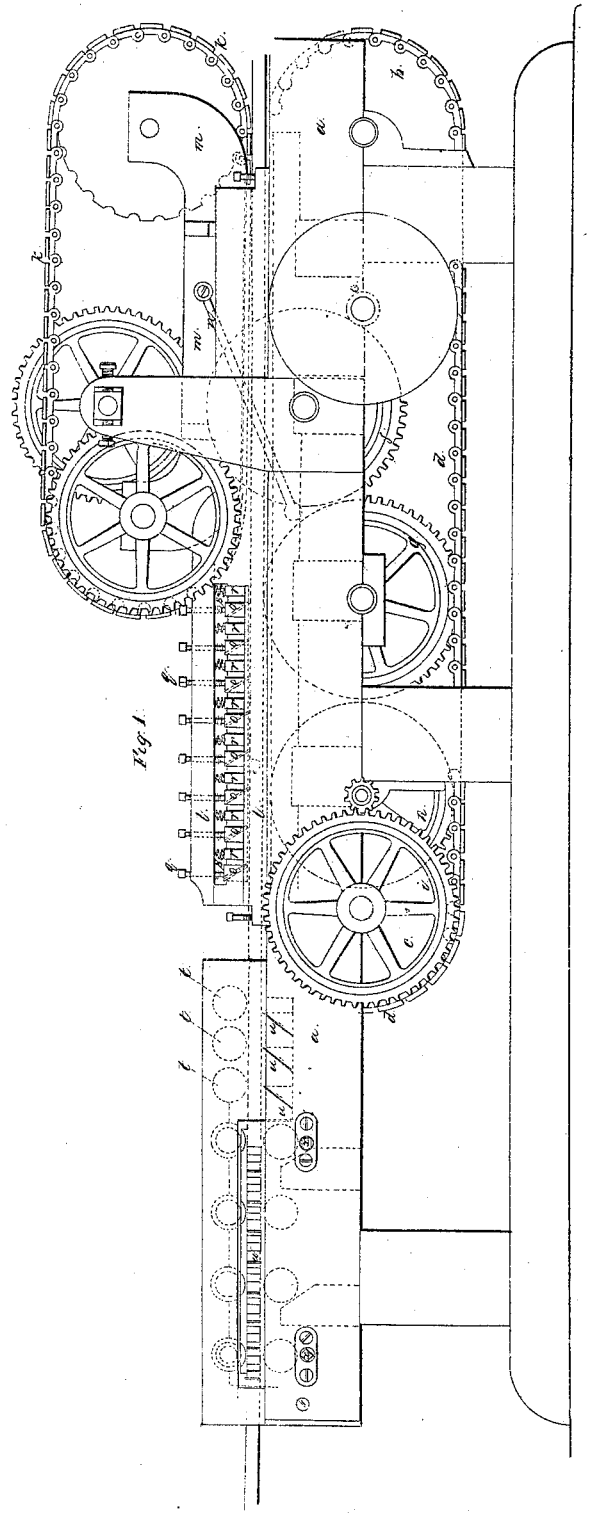
Figure 2:
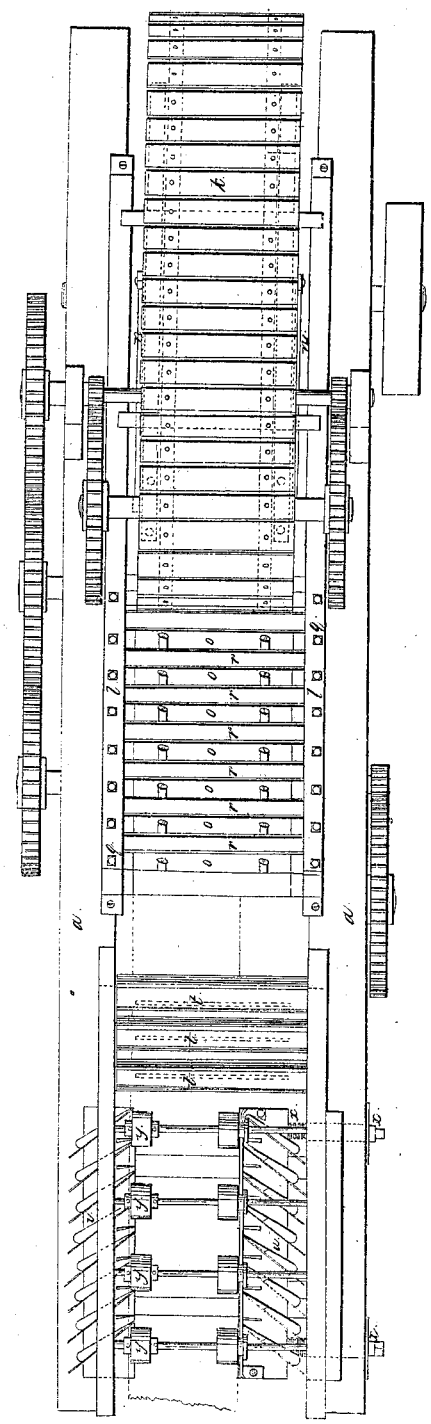

Figure 1 is a side elevation. Fig. 2 is a plan. Fig. 3 is an end elevation, and Figs. 4, 5, and 6 are sections of the planes and stocks. The same letters refer to like parts in all the figures.

My improvements are applicable to planing on one or both sides of the board, and also tonguing and grooving, all in the same machine, by passing the board once through it, and may be used for planing plank, boards, clapboards, and other similar materials.

To construct this machine a substantial frame, $a, a$ is formed of a suitable capacity to contain the machinery; near one end of this frame a carrying cylinder or wheel $b$ is placed, and a similar one $c$, is located near the center of the length of the frame; over these carrying cylinders an endless traveling platform $d$, passes which is formed of lags of metal, or other suitable material, the surface of which should be fluted, linked together in an endless chain, similar to some of the well known horsepowers. The upper part of this platform runs on ways or rollers affixed to the frame for that purpose and which sustain it perfectly level. This platform is moved by a train of pinions and wheels $e, f, g, h, i$, which connect with the prime mover. Directly over the above named platform there is another endless belt $k$, of similar construction, but somewhat shorter; this is geared to the one below, so as to move at the same velocity; between these platforms the board is made to pass endways to the stationary cutters hereafter described. The board being gripped between these two revolving carriers, which cover a considerable extent of its surface, is driven under the stationary cutters and planed. The upper carrier being made to rise and fall for the purpose of admitting materials of different thicknesses. One or more pairs of geared rollers or platforms may be put beyond the cutters, for the purpose of conveying the plank or board out of the machines after it is planed.

The cutters for planing the upper side of the plank are eight, more or less, in number, varying according to the purpose for which they are wanted; they are situated over the inner end of the platform $d$, or that end which is next the center of the frame; the frame $l$ of the cutters is made adjustable, so as to be raised or lowered to suit the material to be planed, and to it the guides or ways $m$, under which carrier $k$, passes, are attached; two connecting rods $n$, one on each side, are connected by one end to the cutter frame, and by the other to the frame which sustains the upper carrier, the end that is attached to the cutter frame being carried down to it at an angle sufficient to create the proper position to carry the board or plank forward against the resistance of the cutters. The cutters are single and double plane irons $o$, (see Fig. 4) made similar to those of a common plane. They are attached to stocks, or cast iron beds $p$, that extend across the machine from one side to the other, and are joined to the side frame $l$, where they can be each adjusted by set screws $g$. Each of the beds are made at different angles with the plank, the first being quite acute, and the last more obtuse, all of which is clearly illustrated in Fig. 4. Between the cutters and directly in front of the edge of each I insert pressure bars or rollers $r$, which form a movable mouth to each cutter; they are so arranged as to be permitted to rise, and are held down by springs $s$, or weights; they yield to any inequalities in the material, to be planed, without clogging, the springs and set screws can be all below the top of the cutters, as shown full size in Fig. 6. This arrangement of a movable mouth piece is very important in the practical operation of the machine, the cutter may be placed oblique or straight across the board, as found most desirable.

Beyond the planing stock I place two or three rollers $t$, between which and another set of planes $u$, the plank passes to plane the other side if required; it then moves forward between side cutters for tonguing and grooving the edges; one of these series of edge cutters is made stationary, as shown at $v$, in the drawing; the other series $w$, on the opposite side, are made movable, and may be set up toward the others with set screws $x$, to hold the edges steady; there are two sets of short friction rollers that pinch the edges of the board between them; one of these sets $y$, are stationary on their shafts, the others have a lateral motion corresponding with the cutters $w$, as will be seen in Fig. 3. The cutters must be sufficient in number to complete the tongue or groove, and for this purpose eight will generally be required. I form spur cutters either on these cutters or made separate like a carpenter's groove plane. The planes may stand in an oblique direction instead of at right angles to the line of motion, if found desirable, and the two last planes should be double ironed, and be set at about the same angle as a carpenter's finishing plane.

It will be obvious that moldings of any description can be cut in this machine, that can be executed by hand plane; and for clap boards the movable platform will require to be made inclined on its surface. A blower or brush roller may be used to clean off the grit from the surface of the board before it reaches the cutters, and also to roll up and clean away the shavings if necessary; and a circular saw may be used for edging the boards.

To sharpen the plane irons they can be removed, together with the stocks, and sharpened upon a grind stone or emery wheel, which will give the proper bevel to the plane, and will also curve out the stock, so as to make as little bearing as possible just behind the cutting edge.

The frame in which the stocks are set is adjusted according to the thickness of the stuff to be worked; each stock is set in the frame and adjusted to take off successive shavings till the material is finished to the thickness required.

In planing light material rollers may be substituted for the top platform, but this I deem substantially a mechanical equivalent when combined and geared with the lower movable platform.

Having thus fully described my improved planing machine, I wish it to be understood that I do not claim merely the two revolving feeding platforms; they having before been used; but

What I claim therein as new, and for which I desire to secure Letters Patent, is—

1. The combination of endless platforms or bands as described above, and below the plank, and geared together so as to be forced to move in one direction and with the same velocity, said top platform being held down upon the board by means of the links ($n$) with a force varying with the resistance of the cutters for the purpose of forcing the plank through under the stationary cutters as above described when used in combination with said stationary cutters.

2. I claim the stationary cutters in combination with the yielding bar mouth pieces substantially in the manner and for the purpose set forth.

3. I claim the adjustable edge rollers in combination with the tonguing and grooving cutters or other stationary edging cutters, as above made known.

JOSEPH P. WOODBURY.

Witnesses:
J. J. GREENOUGH,
WM. GREENOUGH.